United States Patent
Roll et al.

(10) Patent No.: US 6,954,691 B2
(45) Date of Patent: Oct. 11, 2005

(54) METHOD FOR DETERMINING THE DYNAMICS OF VEHICLE MOVEMENT

(75) Inventors: Georg Roll, Heusenstamm (DE); Ulrich Lüders, Burgdorf (DE); Rainer Oehler, Darmstadt (DE); Thomas Raste, Oberursel (DE); Hubertus Raitz Von Frentz, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 107 days.

(21) Appl. No.: 10/258,042

(22) PCT Filed: Apr. 11, 2001

(86) PCT No.: PCT/EP01/04143

§ 371 (c)(1),
(2), (4) Date: Jun. 5, 2003

(87) PCT Pub. No.: WO01/81139

PCT Pub. Date: Nov. 1, 2001

(65) Prior Publication Data

US 2003/0191572 A1 Oct. 9, 2003

(30) Foreign Application Priority Data

Sep. 15, 2000 (DE) .......................................... 100 46 077

(51) Int. Cl.[7] .............................................. G06G 7/76
(52) U.S. Cl. .............................. 701/70; 701/48; 701/72; 701/74; 701/80; 180/197
(58) Field of Search ............................. 701/36, 37, 48, 701/70, 71, 72, 74, 80, 82; 340/459; 180/197

(56) References Cited

U.S. PATENT DOCUMENTS

| | | | |
|---|---|---|---|
| 5,455,770 A | 10/1995 | Hadeler et al. | |
| 6,226,581 B1 * | 5/2001 | Reimann et al. | 701/48 |
| 6,246,945 B1 * | 6/2001 | Fritz et al. | 701/70 |
| 6,253,123 B1 * | 6/2001 | Schramm et al. | 701/1 |
| 6,604,035 B1 * | 8/2003 | Wetzel et al. | 701/38 |

FOREIGN PATENT DOCUMENTS

| | | |
|---|---|---|
| DE | 198 54 633 | 6/1999 |
| DE | 199 35 805 | 2/2000 |
| EP | 0 914 997 | 5/1999 |

* cited by examiner

Primary Examiner—Gertrude A. Jeanglaude
(74) Attorney, Agent, or Firm—Honigman Miller Schwartz and Cohn LLP

(57) ABSTRACT

A method for the online determination of values of driving dynamics for a motor vehicle. To improve the quality of the control of a motor vehicle and to reduce the demands placed on the driver, the invention discloses a driving dynamics control including the (1) estimated output quantities $\hat{y}_m$ in dependence on determined or estimated input quantities u and predetermined or predicted vehicle state variables $\hat{x}$ and optionally further quantities, (2) comparing the estimated output quantities $\hat{y}_m$ with measured output quantities $y_m$, and (3) determining the estimated driving dynamics quantities $\hat{x}(t_k/t_k)$ in dependence on the measurement result and, as the case may be, further criteria.

31 Claims, 7 Drawing Sheets

METHOD FOR DETERMINING THE DYNAMICS OF VEHICLE MOVEMENT

TECHNICAL FIELD

The present invention generally relates to a method for determining vehicle dynamics, and more particularly relates to a method for the online determination of values of driving dynamics for a motor vehicle, a driving dynamics control, and use of the method and the driving dynamics control.

BACKGROUND OF THE INVENTION

An ESP system with yaw rate control represents the state of the art, the control being based on a precise yaw rate sensor that is expensive compared to the overall system. Prior art ABS, TCS, and driving dynamics control systems (such as ESP=Electronic Stability Program) assess the signals from wheel speed sensors (ABS, TCS) and from sensors related to additional specifications of the driver and driving dynamics sensors (ESP) in order to detect and reliably master unstable vehicle movements. The specifications, as defined by the driver, are detected by means of a steering angle sensor, pressure sensors in the master brake cylinder, and the engine management. Typical driving dynamics sensors are a lateral acceleration sensor and, in a four-wheel drive, possibly a longitudinal acceleration sensor. The sensor that is most important for ESP is the yaw rate sensor measuring the rotational speed of the vehicle about the vertical axis.

Driving dynamics control is implemented as a control for the yaw rate $\dot{\psi}$. The nominal value of the yaw rate is generated online by means of a one-track vehicle model. ESP systems of a like design allow a great sideslip angle (angle $\beta$ between longitudinal vehicle axle and speed vector V) in defined travel situations with an insignificant control deviation (difference between nominal and actual yaw rate), as is shown in the left half of the depict of FIG. 8. The sideslip angle may be limited if the driver increases the control deviation by steering corrections and, consequently, causes a major control intervention of the yaw rate control.

BRIEF SUMMARY OF THE INVENTION

An object of the present invention is to improve the quality of the control and reduce the demands placed on the driver.

Advantageously, this is achieved by passing from the one-quantity control to a multiple-quantities control. It is utilized in this respect that the lateral-dynamics state of the vehicle in a first approximation is characterized by the two quantities 'yaw rate $\dot{\psi}$' and 'sideslip angle $\beta$'. These quantities are illustrated in FIG. 1. From a present point of view, it is unfavorable under economical aspects to directly measure the sideslip angle for future ESP systems. Instead, attempts are made to estimate the sideslip angle based on the signals of the available sensor equipment.

According to the present invention, this object is achieved in a generic method by the following steps:

Determining estimated output quantities $\hat{y}_m$ in dependence on determined and/or estimated input quantities u and predetermined or predicted vehicle state variables $\hat{x}$ and optionally further quantities, comparing the estimated output quantities $\hat{y}_m$ with measured output quantities $y_m$, and determining the estimated quantities of driving dynamics $\hat{x}(t_k/t_k)$ in dependence on the comparison result and, as the case may be, further criteria.

In a favorable aspect of this invention, the method is characterized by the following step:

model-based determination of the predicted vehicle state variables $\hat{x}$ in dependence on determined and/or estimated input quantities u and the driving dynamics quantities $\hat{x}(t_k/t_k)$.

In this arrangement, the following input quantities u(t)= $\hat{V}_x, \delta, F_x; \hat{F}_z$ or $F_z, \hat{\mu}_i$ or $\mu_i$ are preferably taken into account in the estimation of the predicted vehicle state variables $\hat{x}$ and in the determination of the driving dynamics quantities $\hat{x}(t_k/t_k)$, where $\hat{V}_x$=estimated longitudinal vehicle speed, $\delta$=the measured steering angle, $F_x$=the determined longitudinal tire or wheel forces, $\hat{F}_z$=the estimated vertical forces, or $F_z$=the determined vertical forces, $\hat{\mu}_i$=the estimated coefficients of friction for the tire/road contact, or $\mu_i$=the determined coefficients of friction for the tire/road contact. As driving dynamics quantities and the predicted vehicle state variables $\hat{x}=[\hat{V}_y, \dot{\psi}, \hat{F}_d]^T$ the lateral vehicle speed $\hat{V}_y$, the yaw rate $\dot{\psi}$ and the disturbing forces $\hat{F}_d$, which are estimated as non-measurable input quantities, are preferably determined.

As other quantities of driving dynamics and the predicted vehicle state variables $\hat{x}=[\hat{T}_d, \hat{\mu}_i]^T$ the disturbing torques $M_d$ and the coefficients of friction $\mu_i$ are determined as non-measurable input quantities.

Advantageously, the predicted vehicle state variables $\hat{x}$ for the next sampling moment $t_{k+1}$ are achieved by integration according to the non-linear equation $$\hat{x}(t_{k+1} | t_k) = \hat{x}(t_k | t_k) + \int_{t_k}^{t_{k+1}} f(\hat{x}(t), u(t)) dt$$

with the start condition $\hat{x}(t_k/t_k)$, where $\hat{x}$ estimated state vector, f(.) continuous, non-linear system equations $x(t_k)$ signal at the discrete moment $t_k$. (current moment)

$\hat{x}(t_k|t_{k-1})$ estimated signal at the moment $t_k$, with only information of the last moment $t_{k-1}$ used $\hat{x}(t_k|t_k)$ estimated signal at the moment $t_k$, with only information of the current moment $t_k$ used $\hat{x}(t_{k+1}|t_k)$ predicted signal for the next moment $t_{k+1}$, with only information of the current moment $t_k$ used $t_k$ discrete moment.

It is appropriate that as an output quantity $\hat{y}_m=[\hat{a}_y]$ the lateral acceleration $a_y$ is estimated.

It is also appropriate that as another output quantity $\hat{y}_m=[\dot{\psi}]$ the yaw rate $\dot{\psi}$ is estimated.

In addition, it is appropriate that as still other output quantities $\hat{y}_m=[\hat{F}_y]^T$ the lateral tire and wheel forces $F_y$. are estimated.

It is favorable that the output quantities $\hat{y}_m$ for the sampling moment $t_k$ are estimated according to the discrete, non-linear equation $h_m$ $$\hat{Y}_m(t_k|t_{k-1}) = h_m(\hat{x}(t_k|t_{k-1}), u_m(t_k))$$

from the vehicle state variables $\hat{x}(t_k|t_{k-1})$ and the input quantities $u_m(t_k)$, where $\hat{y}_m$ estimated output vector of the measurable outputs $\hat{x}$ estimated state vector, $u_m$ input vector of the measurable inputs $h_m(.)$ discrete, non-linear measurement equations $\hat{x}(t_k|t_{k-1})$ estimated signal at the moment $t_k$, with only information of the last moment $t_{k-1}$ being used $\hat{y}(t_k|t_{k-1})$ estimated signal at the moment $t_k$, with only information of the last moment $t_{k-1}$ used $t_k$ discrete moment.

It is especially suitable that at least one of the estimated output quantities $\hat{y}_m=[\hat{F}_y, \hat{\alpha}_y, \dot{\hat{\psi}}]^T$ is compared to at least one of the determined (acquired directly or indirectly by means of sensors) output quantities $y_m(t_k)=[F_y, \alpha_y, \dot{\psi}]^T$ and the comparison results $e(t_k)$ are sent to a summation point, preferably by way of a gain matrix K, for the correction of the vehicle state variable $\hat{x}(t_k|t_{k-1})$, where $\hat{x}(t_k|t_{k-1})$= estimated signal at the moment $t_k$, with information of the last moment $t_{k-1}$ being used.

It is advantageous that the gain matrix K at every moment $t_k$ is defined pursuant the relation $K(t_k)=f(\hat{A}, G)$ where G=information content of the determined (measured) signals and $\hat{A}$=estimated operating point of the non-linear vehicle model.

It is favorable that the correction of the driving dynamics quantities is carried out according to the relation $$\hat{x}(t_k|t_k)=\hat{x}(t_k|t_{k-1})+K(t_k)e(t_k).$$

In a particularly favorable fashion, the method resides in the step: establishing the estimated controlled quantities $y_r$ at the moment $t_k$ by using information about the current moment from the driving dynamics quantities $\hat{x}(t_k|t_k)$ and the input quantities $u_m(t_k)$ according to the relation $\hat{y}_r(t_k|t_k)=h_r(\hat{x}(t_k|t_k),u_m(t_k))$, where $u_m(t_k)$=vector of the sensed discrete input quantities.

Further, the method is favorable due to the step: determining the estimated control quantities $y_r$ at the moment $t_k$ by using information of the last moment from the vehicle state variables $\hat{x}(t_k|t_{k-1})$ and the input quantities $u_m(t_k)$ pursuant the relation $\hat{y}_r(t_k|t_{k-1})=h_r(\hat{x}(t_k|t_{k-1}),u_m(t_k))$, where $u_m(t_k)$=vector of the sensed discrete input quantities.

A particularly favorable multiple-quantities control is achieved by means of the following steps:

determining an estimated sideslip angle $\hat{\beta}$ as a controlled quantity $\hat{y}_r(t_k|t_{k-1})$ or $\hat{y}_r(t_k|t_k)$, respectively, comparing the estimated sideslip angle $\hat{\beta}$ with a sideslip angle reference quantity $\beta_{ref}$, producing an additional yaw torque $T_{req}$ from the estimated difference between the sideslip reference quantity $\beta_{ref}$ and the sideslip angle $\hat{\beta}$ and a difference between a yaw rate reference quantity $\dot{\psi}_{ref}$ and a yaw rate $\dot{\psi}$ or $\dot{\hat{\psi}}$ or $\dot{\psi}_{linear}$ and actuation of at least one wheel brake of the motor vehicle in dependence on the additional yaw torque $T_{req}$.

The method is advantageously used in a driving dynamics control, especially ESP control or suspension control.

According to the present invention, a generic driving dynamics control is characterized by a first determining unit (402) for estimating the controlled quantities $\hat{\beta}$ and/or $\hat{\alpha}_y$, $\hat{\alpha}_h$ from the input quantities $V_x$, $\delta$, $F_x$, $\dot{\psi}$, $\hat{\mu}$, $\alpha_y$, $\hat{F}_z$, and/or, if necessary, other quantities $F_z$, $\dot{\psi}_{linear}$, deactivation logic (405) for deactivating the sideslip angle control in dependence on the input quantities $\hat{\alpha}_y$, $\hat{\alpha}_h$ and/or quantities representative of travel situation of the motor vehicle, such as rearward driving, driving around a steep turn, and the like second determining unit (404) for the adaptive sideslip angle torque calculation from the input quantities $\hat{\beta}$, $\beta_{ref}$, $\dot{\psi}$, $V_{ref}$ or Vx, $\hat{\mu}_i$, respectively, third determining unit (406) for the arbitration of an additional yaw torque $T_{req}$ from the yaw torque $T_{reg\_ESP}$ and $T_{reg\_beta}$.

Favorable improvements of the present invention are described in the subclaims.

An object of the present invention is to estimate controlled quantities of adequate precision and suitable for driving dynamics control (which correspond to the vehicle state quantities or permit being directly derived therefrom) such as yaw rate, sideslip angle, roll angle, pitch angle with an estimation method based on a non-linear vehicle model and by using tire or wheel forces. The tire or wheel forces may favorably be measured during driving by using the tire with a sidewall torsion sensor. The 'sidewall torsion (SWT) sensor' is based on the idea of measuring the deformation of the tire by means of sensors on the vehicle body and to conclude from this deformation, in view of the elastic properties, to the forces that act.

Depending on the demanded controlled quantities (control task) and the necessary quality of the estimation, other sensor signals related to the longitudinal, lateral and roll movements of the vehicle (e.g. lateral acceleration, wheel speeds, yaw rate and/or roll rate) may be taken into consideration in the estimation.

New driving dynamics control systems are drafted with these estimated controlled quantities.

For the new tire-force or wheel-force assisted driving dynamics control, the conventional ESP system was coupled to the SWT tire sensor equipment and extended by a sideslip angle control (that is not dependent on the SWT tire sensor equipment, however) in a favorable embodiment. As this occurs, the longitudinal tire or wheel forces $F_x$ and lateral tire or wheel forces $F_y$ are known, which assist a model in the estimation of the sideslip angle and achieve a quality of the sideslip angle estimation that is sufficient for a control.

This combined yaw rate control and sideslip angle control renders it possible to provide a more sensitive stability control that is still more capable with respect to the average driver. Those sideslip angles which are considered unpleasant or can no longer be tackled by the driver starting from a defined magnitude are prevented. The steering effort in situations being critical in terms of driving dynamics is considerably reduced.

This becomes clear when comparing a driving maneuver with a standard ESP with a maneuver with ESP with sideslip angle control. In a circling movement of a vehicle in the critical range on snow, a sideslip angle develops in the standard ESP as the driving force reduces, said sideslip angle allowing to be compensated only by an abrupt steering reaction (FIG. 8, left hand side). The information about the yaw rate alone is not sufficient for stabilizing.

In contrast thereto, the sideslip angle in the ESP with sideslip angle control is limited to a quantity that can be mastered by an average driver. The measure and estimated sideslip angle correspond to each other with sufficient accuracy on account of the estimation based on tire force or wheel force. No additional steering activities are required from the driver (cf. FIG. 8).

2. Advantages of the Present Invention

The model-based linking of signals of low-cost sensors permits estimating signals (e.g. sideslip angle) which are required for a driving dynamics control and up to now were impossible to measure at low cost. Based on these estimated controlled quantities, among others, the following new driving dynamics control structures are possible:

Replacement of the yaw rate sensor (cost reduction). The signal is determined by an estimated quantity. The known ESP system is maintained in its structure.

New driving stabilization control structures connected with an improvement of control quality due to a sideslip angle control or multiple-quantities control (combined yaw rate/sideslip angle control with a specification of reference values for sideslip angle and yaw rate).

New active steering systems on the basis of the sideslip angle determination.

DETAILED DESCRIPTION OF THE PREFERRED EMBODIMENTS

3. Description of the Method

In the following, the method for the estimation of the states and the controlled quantities of the vehicle derived therefrom, as well as the structure of the driving dynamics control will be explained which is based on the estimated controlled quantities.

3.1. Estimation of the Controlled Quantities

Figure 1:
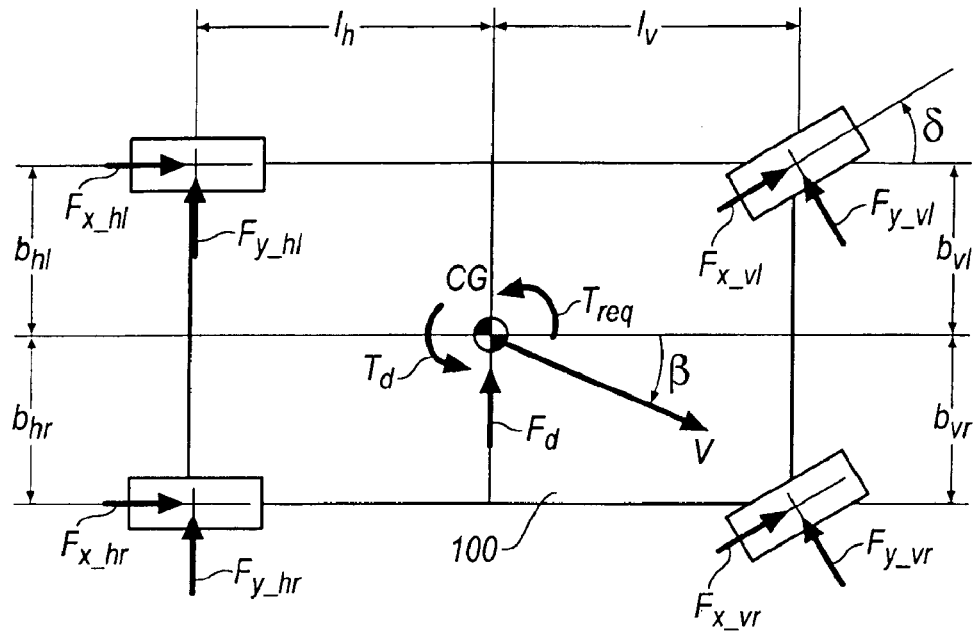
FIG. 1 shows circumferential wheel forces (longitudinal forces) $F_x$ and lateral forces $F_y$ in the wheel-related systems of coordinates in relation to the wheel hub centers.

The forces developing due to the tire/road contact and acting on the vehicle are used for the method. These forces may be circumferential wheel forces, lateral forces, and/or vertical wheel forces. FIG. 1 shows exemplarily circumferential wheel forces (longitudinal forces) $F_x$ and lateral forces $F_y$ in the wheel-related systems of coordinates in relation to the wheel hub centers. An SWT sensor is used to determine the forces, using a magnet principle for measuring the deformation of the tire or the wheel, respectively. A special hard magnetic rubber compound was developed for the SWT encoder and is embedded in the tire sidewall. The rubber compound is magnetized after the vulcanization of the tire. North and south poles alternate in the pole patterns that result (DE 196 20 581). Two active magnetic field sensors mounted on the chassis measure the way the magnetic field changes as the tire rotates. Signals that permit being evaluated up to very low speeds are obtained by the selection of active sensors. The signal amplitude is irrespective of the rotational speed of the tire, which is in contrast to inductive sensors. The longitudinal deformation may be calculated from the phase difference between the two sensor signals. The amplitude changes reversely to the distance between sensors and sidewall, thus permitting the lateral deformation of the corners (tires, wheel hub, suspension) to be determined by said amplitude. Longitudinal and lateral forces are calculated from the two deformation components. In addition, it is possible to determine the wheel speed with only one sensor, in the same manner as with an ABS sensor. The raw signals gathered by the SWT sensor are filtered and amplified before they are relayed to a central evaluating electronic unit. In the evaluating unit the phase difference and the signal amplitude is determined, and the force components are calculated therefrom by means of a digital signal processor. The information about force is then relayed to the control system where other quantities are estimated by means of a vehicle model, said quantities being important to describe the driving situation (see below).

These tire or wheel forces may also be determined directly or indirectly, with the help of further or other appropriate sensor equipment, by way of a suitable mathematic conversion such as force measuring wheel rims, tire-sidewall torsion sensors, surface sensors, determination of clamping force/clamping pressure from actuating signals of the brake actuator by way of a mathematic model or clamping force/pressure measurement of the brake actuator (circumferential forces), spring travel sensors or pressure sensors in air springs or wheel load model (cf. equation F4.9) from information about lateral and longitudinal acceleration (vertical forces).

General Description of the Estimation Process

Figure 2:
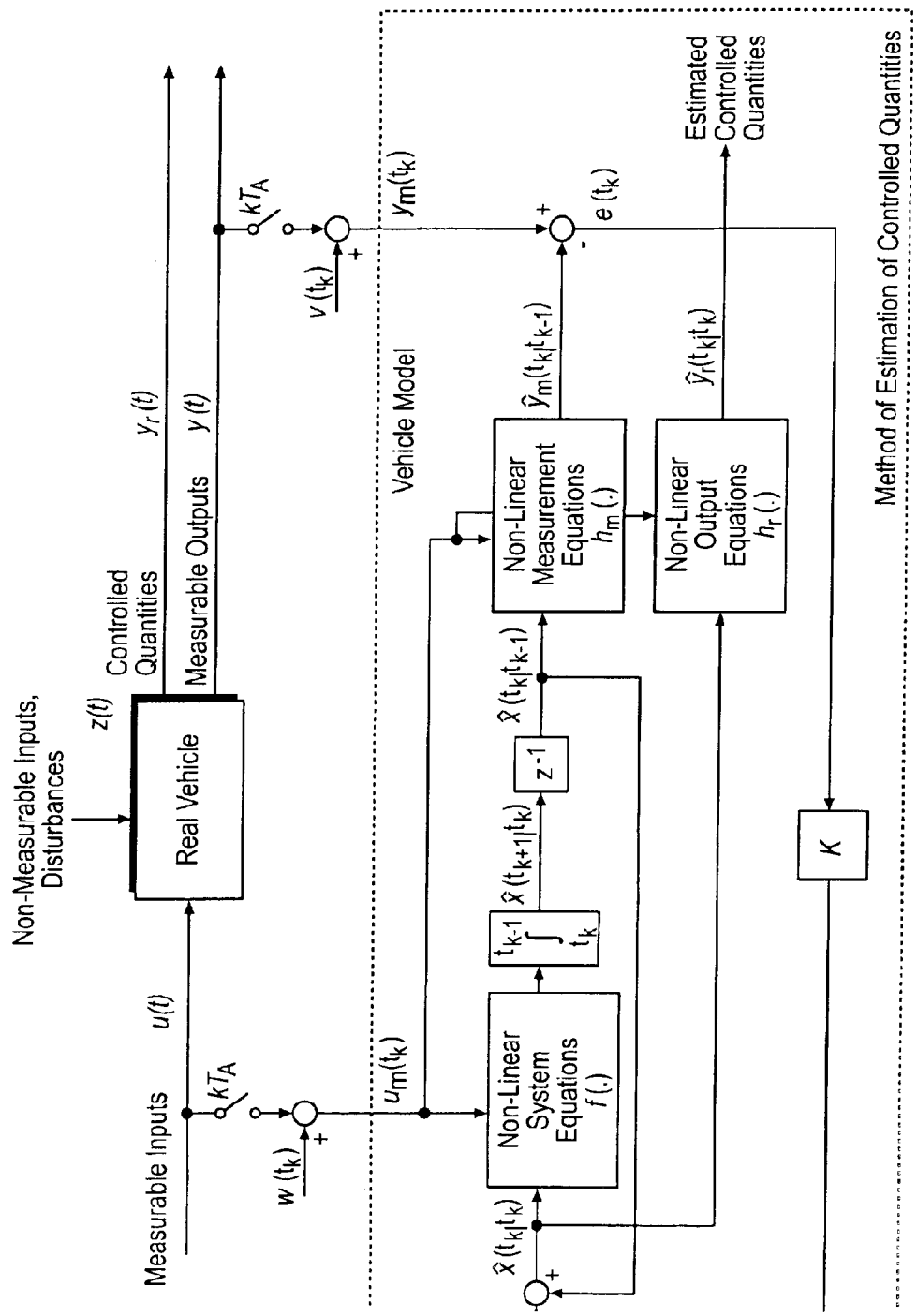
FIG. 2 and 2A illustrate two embodiments of the process for the estimation of the states of the vehicle and the controlled quantities derived form said estimation.

FIG. 2 illustrates the general block wiring diagram of the process for the estimation of the states of the vehicle and the controlled quantities derived from said estimation.

Measurable inputs u(e.g. steering angle), which may be determined by customary sensors, and/or non-measurable inputs z that can be measured with great effort only (e.g. side wind) act on the real vehicle. The outputs of the vehicle describing the reaction of the vehicle to the inputs are subdivided into the measurable outputs y (e.g. lateral tire forces) and the controlled quantities $y_r$ (e.g. yaw rate, sideslip angle, king pin inclination, roll angle) required for the control of driving dynamics.

Other measurement variables for improving the estimation may be integrated into the process in addition to the tire or wheel forces. These measurement variables may be variables such as lateral/longitudinal acceleration, rotational wheel speeds, yaw rate, roll rate, and/or pitch rate. The measurable outputs y and the controlled quantities $y_r$ may correspond to each other in individual quantities, depending on the sensor's equipment, e.g. when using a yaw rate sensor and a combined yaw rate/sideslip angle control. The yaw rate is both a measurable output and a controlled quantity in this case.

With the knowledge of the measurable inputs and outputs of the real vehicle—corresponding to the sensor' equipment—the method for the estimation of the driving dynamics quantities permits estimating controlled quantities at a rate of precision sufficient for driving dynamics control. It will be appreciated for the estimation process to be as insensitive as possible to the non-measurable inputs and modeling errors.

This may be achieved by the method presented in the following:

A non-linear model of the vehicle (FIGS. 2 and 2a, shaded in grey) is the basis of the estimation method. The estimated driving state variables or driving dynamics quantities $\hat{x}$ may be determined by means of the continuous, non-linear system equations $f(\hat{x}(t),u(t))$ of the vehicle (differential equation system of first order). Based on these driving state variables or driving dynamics quantities, the estimated controlled quantities $\hat{y}_r(t_k|t_k)$ or $\hat{y}_r(t_k|t_{k-1})$ are calculated by way of the discrete, non-linear initial equations $h_r(\hat{x}(t_k|t_k),u_m(t_k))$ or $h_r(\hat{x}(t_k|t_{k-1}), u_m(t_k))$. A non-linear tire model for determining the tire forces from the vehicle states is also contained in the equations for the vehicle model.

An error signal $e(t_k)$ is generated by means of a comparison between the measured output quantities $y_m(t_k)$ (e.g. lateral forces of the tires) and the estimated measured variables $\hat{y}_m(t_k|t_{k-1})$ being calculated from the estimated vehicle state variables $\hat{x}$ by means of the discrete non-linear measurement equations $h_m(\hat{x}(t_k|t_{k-1}), u_m(t_k))$. The state variables $\hat{x}$ of the non-linear vehicle model are corrected with the feedback of this error signal $e(t_k)$ by way of a gain matrix K. The model is adapted and the estimation improved by this feedback of the measured variables.

The measured variables available (sensor equipment) and the quality of the sensor signals hence influence the quality of the estimation. If, for example, in addition to the tire forces other measured variables are included in the estimation, this will improve the estimation of the controlled quantities due to the linking operation by way of the vehicle model. This renders it possible for example to estimate a yaw rate with a higher rate of precision, although the used yaw rate senor may be reduced in its quality compared to the current system. When using other high-quality measured variables (e.g. current yaw rate sensor and lateral acceleration sensor), it is conceivable as an alternative to employ tire or wheel force signals of reduced quality or to manage without the feedback of the lateral tire or wheel forces when reduced estimation accuracy is tolerated.

Further, the estimation can be stabilized by the feedback of the error signal even in a vehicle model that is unstable on account of the operating point. Thus, the estimation is prevented from drifting due to a sensor offset, as is possible e.g. in a free integration. Further, the method renders it possible to estimate forces and torques (non-measurable inputs) that act on the vehicle. Transformed to the center of gravity, the disturbing force $F_d$ and the disturbing torque $T_d$ are plotted in FIG. 1 exemplarily for the driving dynamics. The estimation of a disturbance variable is dealt with more closely in this embodiment.

Figure 2A:
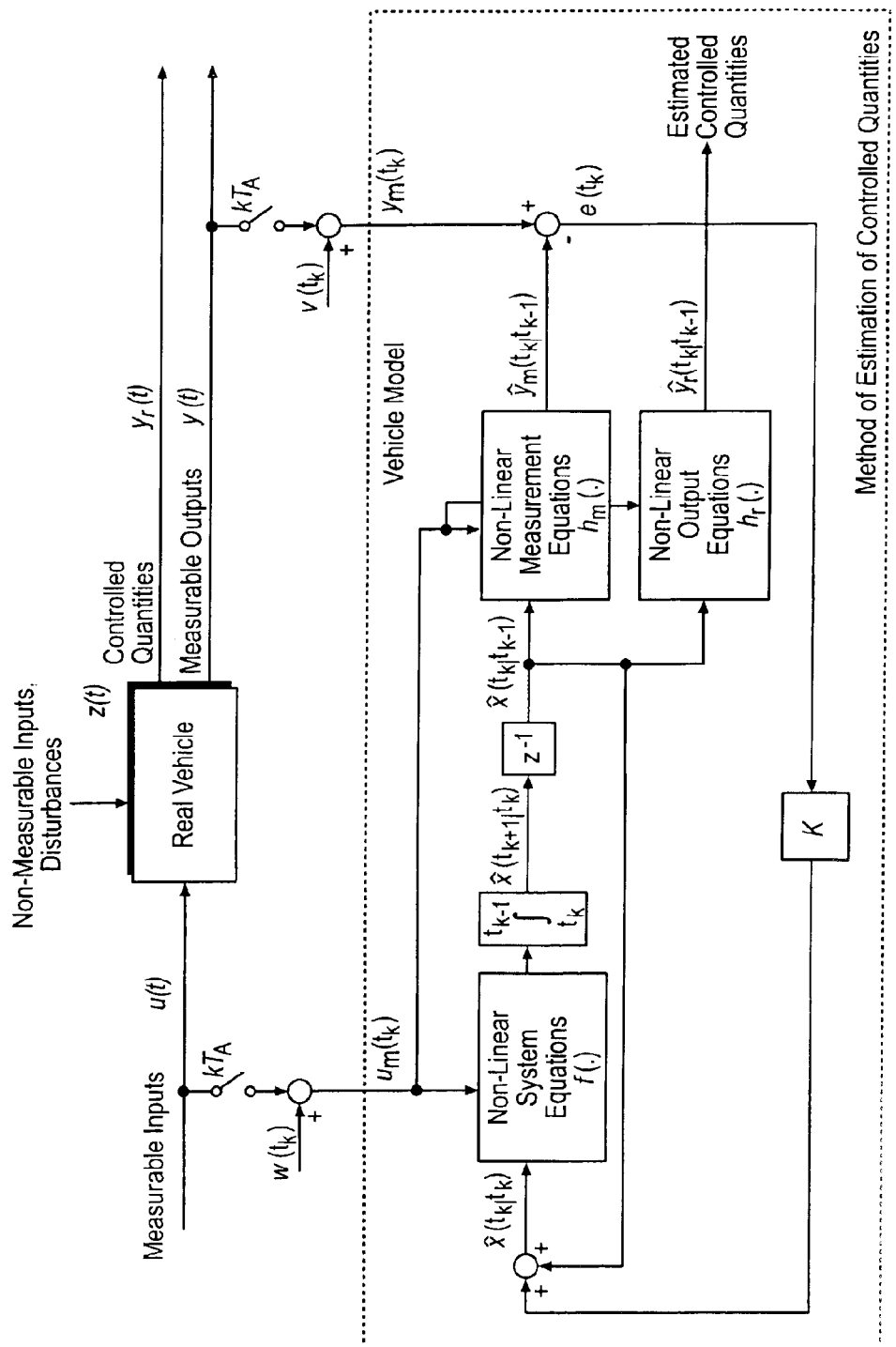

Description of the Estimation Equations (cf. FIGS. 2 and 2a)

The measurable inputs u and the measurable outputs y of the real vehicle are gathered by the measurement value detection of the digital control processor (e.g. the driving dynamics controller) at discrete moments $t_k$ with the sampling time $T_A$. In addition, the input disturbances $w(t_k)$ and output disturbances $v(t_k)$ such as sensor noises or quantization effects of the A/D converter are superposed. The sensed, discrete measured variables[1] $u_m(t_k)$ and $y_m(t_k)$ are used for the method to estimate the controlled quantities.

For each sampling step the estimated measured variables $\hat{y}_m(t_k|t_{k-1})$ are calculated from the predicted states $\hat{x}(t_k|t_{k-1})$ and

[1] Nomenclature of the correlations with respect to time:

$x(t_k)$ signal at the discrete moment $t_k$. (current moment)

$\hat{x}(t_k|t_{k-1})$ estimated signal at moment $t_k$, with only information of the last moment $t_{k-1}$ used $\hat{x}(t_k|t_k)$ estimated signal at moment $t_k$, with information of the current moment $t_k$ used $\hat{x}(t_{k+1}|t_k)$ predicted signal for the next moment $t_{k+1}$, with only information of the current moment $t_k$ used. the inputs $u_m(t_k)$ by means of the discrete non-linear measurement equation $h_m(.)$ (F3.1). The error signal $e(t_k)$ between measured and estimated measured variables (F3.2) along with the gain matrix K leads to a correction of the predicted states (F3.3). With the corrected states $\hat{x}(t_k|t_k)$ or the states of the last moment $\hat{x}(t_k/k_{k-1})$ the estimated controlled quantities $\hat{y}_r(t_k|t_k)$ or $\hat{y}_r(t_k|t_{k-1})$ are determined by the discrete, non-linear initial equation $h_r(.)$ (F3.4 or F3.4.2). The relations $\hat{x}(t_{k+1}|t_k)$ for the next sampling moment $t_{k+1}$ are predicted according to equation F3.5 by integration of the non-linear continuous system equations f(.) with the initial relation $\hat{x}(t_k|t_k)$.

$$\hat{y}_m(t_k|t_{k-1}) = h_m(\hat{x}(t_k|t_{k-1}), u_m(t_k)) \qquad \text{F3.1}$$

$$e(t_k) = y_m(t_k) - \hat{y}_m(t_k|t_{k-1}) \qquad \text{F3.2}$$

$$\hat{x}(t_k|t_k) = \hat{x}(t_k|t_{k-1}) + K(t_k)e(t_k) \qquad \text{F3.3}$$

$$\hat{y}_r(t_k|t_k) = h_r(\hat{x}(t_k|t_k), u_m(t_k)) \qquad \text{F3.4.1}$$

$$\hat{y}_r(t_k|t_{k-1}) = h_r(\hat{x}(t_k|t_{k-1})u_m(t_k)) \qquad \text{F3.4.2}$$

$$\hat{x}(t_{k+1}|t_k) = \hat{x}(t_k|t_k) + \int_{t_k}^{t_{k+1}} f(\hat{x}(t), u(t))dt \qquad \text{F3.5}$$

where $t_k$ discrete moment $u_m$ input vector of the measurable inputs $y_m$ output vector of the measurable outputs $\hat{y}_m$ estimated output vector of the measurable outputs $\hat{y}_r$ estimated output vector of the controlled quantities $\hat{x}$ state vector, estimated $h_m(.)$ discrete, non-linear measurement equations $h_r(.)$ discrete, non-linear initial equations f(.) continuous, non-linear system equations (e.g. lateral dynamics including tire model, roll dynamics)

e residues, difference between measured and estimated outputs

K (time-responsive, operating-point-responsive gain matrix)

The discretized form of the integration pursuant equation F3.5 may e.g. be implemented by a simple gamma function ('Euler-Ansatz').

$$\hat{x}(t_{k+1}|t_k) = \hat{x}(t_k|t_k) + T_A f(\hat{x}(t_k|t_k), u(t_k)) \qquad \text{F3.6}$$

Determination of the Feedback Gain Matrix K

The feedback gain matrix K can be determined at any moment $t_k$ according to equation F3.7 in dependence on two criteria G: information content of the measured signals and $\underline{A}$: estimated operating point of the non-linear vehicle model.

$$K(t_k) = f(\hat{\underline{A}}, G) \qquad \text{F3.7}$$

The information content of a sensor signal is e.g. determined by the quality of the sensor (precision, noise, drift), the position of installation (superposed vibrations, turns of the coordinates) and the modeling error of the vehicle model, meaning: how well does the measured quantity 'fit' to the mathematic approach. The elements of the return gain matrix K are selected in such a way that each measured output, depending on its information content, is optimally used for the correction of the estimated vehicle states. Thus, a sensor signal of low quality e.g. has also little influence on the estimation of the controlled quantities. If the information content does not change with time, consequently, no time derivative of K will result. However, it is also possible to adapt a detected change of a sensor signal (e.g. failure, increased noise) accordingly in the feedback gain matrix.

The dynamic behavior of the vehicle is significantly responsive to the vehicle condition. Under control technology aspects this means that the inherent values of the differential equation describing the vehicle vary within wide limits as a function of e.g. the vehicle speed and the operating-point-responsive lateral tire stiffness values (gradient of the characteristic curve of the lateral tire force, FIG. 5). To achieve an optimal estimation, it is suitable to adapt the feedback gain matrix K to the operating point, that means estimated states, measured/estimated outputs, and/or controlled quantities. This may occur with respect to each sampling step or in defined operating ranges (e.g. saturation/ no saturation of the tire characteristic curve, high/low speed).

3.2 Controller Structure of Driving Dynamics Control

Figure 3:
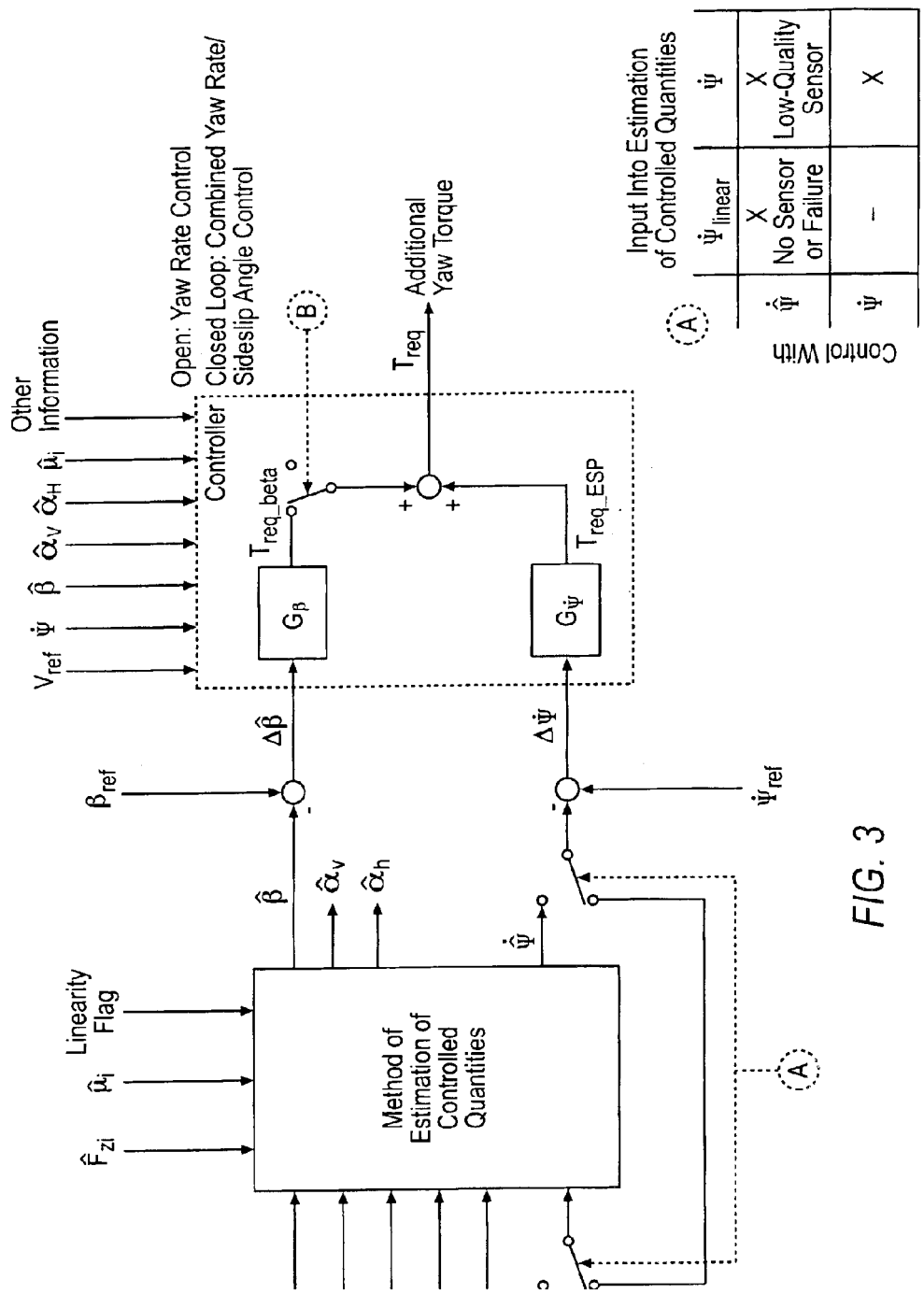
FIG. 3 illustrates the general structure of the disclosed lateral dynamic control (yaw torque control) based on the estimated controlled quantities sideslip angle $\hat{\beta}$ and yaw rate $\dot{\hat{\psi}}$.

The controlled quantities 'sideslip angle' and 'yaw rate' are required for controlling the lateral dynamics of the vehicle. FIG. 3 illustrates the general structure of the disclosed lateral dynamics control (yaw torque control) based on the estimated controlled quantities sideslip angle $\hat{\beta}$ and yaw rate $\hat{\dot{\psi}}$. When a high-quality yaw rate sensor is used, it is also possible to use the measured yaw rate $\dot{\psi}$ for the control instead of the estimated yaw rate.

The estimation of the controlled quantities sideslip angle $\hat{\beta}$ and yaw rate $\hat{\dot{\psi}}$ is carried out according to the method that is described in sections 3.1 and 4.1. Quantities used for the estimation (cf. FIG. 3) are the inputs $u_m$: vehicle speed $V_x$, steering angle $\delta$, longitudinal tire or wheel forces $F_{xi}$, and the measured variables $y_m$: lateral acceleration $a_y$, the lateral tire or wheel forces $F_{yi}$, and yaw rate $\dot{\psi}$. As an alternative to the yaw rate $\dot{\psi}$ it is also possible to use the substitute signal $\dot{\psi}_{linear}$ in connection with the linearity flag. Other input quantities defined outside the estimation method, which are measured by appropriate sensors or calculated or estimated from other pieces of information, are the vertical forces $\hat{F}_{zi}$ of each wheel and the coefficients of friction $\hat{\mu}_i$ for the tire/road contact.

Based on the sensor configuration, the suitable estimation/ controller structures are illustrated in FIG. 3 (table A,B):

Control with the Estimated Yaw Rate $\hat{\dot{\psi}}$

To produce the actuating variable $\Delta\dot{\psi}$ the estimated yaw rate $\hat{\dot{\psi}}$ is used. The yaw rate sensor can be economized for cost reasons or reduced in its quality.

A signal of a yaw rate sensor of lower quality (less accuracy, offset drift) is included as an input in the estimation of controlled quantities. The estimated yaw rate has a higher quality than the measured yaw rate what is due to the fact that information of other input quantities and measured variables is utilized.

If no yaw rate sensor is employed or the sensor has failed, the calculated substitute signal $\dot{\psi}_{linear}$ in conjunction with the linearity flag may be used to improve the estimation of the controlled quantities. This substitute signal known from the current ESP system for monitoring the yaw rate sensor is produced from the difference wheel speeds of an axle, or the stationary steering model, or the lateral acceleration. However, this substitute signal applies only in the linear working range of vehicle dynamics. In dependence on the linearity flag indicative of this validity range, the feedback for the error signal between measured and estimated yaw rate $e_{\dot{\psi}} = \dot{\psi}_{linear} - \hat{\dot{\psi}}$ to the estimated states $\hat{x}(t_k)$ (see FIG. 2) is obviated. The corresponding elements of the feedback matrix K may then be set to zero, for example.

Control with the Measured Yaw Rate $\dot{\psi}$

This configuration is suitable when a sensor of up-to-date quality comprised in the standard ESP system is employed.

The measured yaw rate is included in the estimation of controlled quantities for improving the estimated sideslip angle, and the measured quantity instead of the estimated quantity may be used to produce the actuating variable $D\dot{\psi}$.

When the estimated sideslip angle is not used for the control, the controller structure known from series is achieved. It is conceivable in this configuration to manage without the lateral tire or wheel forces $F_{yi}$ as measured variables, with a tolerable reduction of the quality of the estimated sideslip angle. This is especially suitable for brake-by-wire systems that permit detecting the longitudinal tire forces upon actuation of the brake actuator without any additional sensor equipment.

The combined yaw rate/sideslip angle control (switch B) may be implemented with all yaw rate configurations (table A, FIG. 3) and is preferred over the pure yaw rate control.

The yaw torque controller comprises a non-linear dynamic controller $G_b$, which as an input receives the actuating variable Db between the estimated sideslip angle $\hat{\beta}$ and the reference sideslip angle $b_{ref}$, and a non-linear dynamic controller $G_{\dot{\psi}}$, which as an input receives the actuating variable $\Delta\dot{\psi}$ between measured/estimated yaw rate and reference yaw rate $\dot{\psi}_{ref}$. Instead of, or in connection with, the vehicle sideslip angle $\beta$, the estimated king pin inclinations $\hat{\alpha}_V$, $\hat{\alpha}_H$ of the front and rear axle may be used as a controlled quantity. The two output quantities of the controllers are added to an additional yaw torque $T_{req}$ being subsequently (not shown in FIG. 3) distributed to the wheels as a brake force requirement.

The reference value $\dot{\psi}_{ref}$ for the yaw rate is produced from a dynamic one-track model as in the standard ESP. The reference value $\beta_{ref}$ for the sideslip angle may also be produced by means of a dynamic model. In the normal operating range of the vehicle, however, the sideslip angle is small (<2°) so that an activation threshold is sufficient as $\beta_{ref}$. A specification from a dynamic model is not necessary.

The parameters or activation thresholds of the non-linear dynamic controller are adapted to the respective driving condition among others as a function of the speed $V_x$, the yaw rate $\dot{\psi}$ or $\hat{\dot{\psi}}$, respectively, the estimated sideslip angles and king pin inclinations $\hat{\beta}, \hat{\alpha}_V, \hat{\alpha}_H$, and the coefficient of friction. In the embodiment (section 4.2), the generation of the sideslip angle reference value and the adaptation of the sideslip angle controller $G_b$ is described.

A preferred embodiment due to a performance which is significantly improved in comparison to the known ESP system is directed to the combined yaw rate/sideslip angle control by using a yaw rate sensor of identical quality or a quality reduced compared to up-to-date sensors (right column, table A, FIG. 3).

The combined yaw rate/sideslip angle control leads to an improvement of the standard ESP, especially by Stabilizing the vehicle in situations where the standard ESP does not intervene such as circular travel with load change Relieving the driver by a reduced steering effort for the stabilization of the vehicle, e.g. when changing lanes.

4. Embodiment

The following example describes a favorable embodiment of the present invention comprising the estimation of the lateral dynamics conditions 'yaw rate' and 'sideslip angle' and the combined yaw rate/sideslip angle control based thereon. A yaw rate sensor signal is available for the estimation and control.

4.1 Estimation of the Controlled Quantities 'yaw rate' and 'sideslip angle'

The basis for the estimation of yaw rate and sideslip angle is a plane two-track model for the lateral dynamics movement by neglecting roll and pitch dynamics. The effect of rolling and pitching is taken into consideration in the tire model by way of the influence of the vertical wheel force.

The estimation of the controlled quantities is carried out according to the equations 3.1 to 3.4 and 3.6. The input quantities, output quantities, and state variables of the basic vehicle model are:

$u=[V_x,\delta,F_x,\hat{F}_z,\hat{\mu}_i]^T$ measurable inputs $\hat{y}=[\hat{F}_y,\hat{a}_y,\dot{\hat{\psi}}]^T$ estimated measurable outputs $\hat{x}=[\hat{V}_y,\dot{\hat{\psi}},\hat{F}_d]^T$ estimated states of the vehicle $\hat{y}_r[\hat{\beta},\hat{\alpha}_v,\hat{\alpha}_h,\dot{\hat{\psi}}]^T$ estimated controlled quantities $y_m=[F_y,a_y,\dot{\psi}]^T$ measurable outputs $\qquad$ F4.1

The measurable inputs u are the longitudinal vehicle speed $V_x$ which is a quantity estimated in the standard ESP based on the wheel speeds, the steering angle $\delta$, the four longitudinal tire or wheel forces $F_x$, the four vertical forces $\hat{F}_z$, calculated pursuant equation F4.9 and the four coefficients of friction $\hat{\mu}_i$ for the tire/road contact. The coefficients of friction may e.g. be either adopted from the estimated frictional value of the standard ESP, or may be determined by a special estimation algorithm, e.g. from the tire forces or quantities derived therefrom, in pairs or per wheels.

The outputs $y_m$ or $\hat{y}$, respectively, are the four lateral tire or wheel forces $F_y$, the lateral acceleration $a_y$, preferably in the center of gravity or in the sensor position, and the yaw rate $\dot{\psi}$. The estimated controlled quantities $\hat{y}_r$ are the sideslip angle $\hat{\beta}$, the king pin inclination for front and rear axles $\hat{\alpha}_v$, $\hat{\alpha}_h$, and the yaw rate $\dot{\hat{\psi}}$.

The estimated states $\hat{x}$ are the lateral vehicle speed $\hat{V}_y$, the yaw rate $\dot{\hat{\psi}}$, and the disturbing force $\hat{F}_d$ (cf. FIG. 1), which shall be estimated as a non-measurable input (e.g. wind force, impact). To estimate the disturbance variable, it is interpreted as a state $x_3$ and included in the state vector x. This procedure is equivalently possible for further disturbance variables such as the disturbing torque $T_d$ and/or unknown or changing parameters (mass of the vehicle, coefficient of friction tire/road).

Pursuant equation F3.1 the estimated measurable outputs $\hat{y}_m(t_k|t_{k-1})=h_m(\hat{x}(t_k|t_{k-1}),u_m(t_k))$ are determined based on the non-linear measurement equation:

$$\hat{y}_{m1} = \hat{F}_{y\_vl}(t_k|t_{k-1}) \qquad F4.2$$

$$\hat{y}_{m2} = \hat{F}_{y\_vr}(t_k|t_{k-1})$$

$$\hat{y}_{m3} = \hat{F}_{y\_hr}(t_k|t_{k-1})$$

$$\hat{y}_{m4} = \hat{F}_{y\_hl}(t_k|t_{k-1})$$

$$\hat{y}_{m5} = a_y(t_k|t_{k-1}) = \frac{1}{m}\left((F_{x\_vr} + F_{x\_vl})*\sin\delta + \left(\hat{F}_{y\_vl} + \hat{F}_{y\_vr}\right)*\cos\delta + \left(\hat{F}_{y\_hl} + \hat{F}_{y\_hr}\right) + F_d\right)$$

$$\hat{y}_{m6} = \dot{\hat{\psi}}(t_k|t_{k-1})$$

with the lateral tire forces from the non-linear tire model $$\hat{F}_{y\_vl}(t_k|t_{k-1}) = f\left(\hat{\alpha}_v(t_k|t_{k-1}), F_{x\_vl}(t_k), \hat{F}_{z\_vl}(t_k), \hat{\mu}_{vl}(t_k)\right) \qquad F4.3$$

$$\hat{F}_{y\_vr}(t_k|t_{k-1}) = f\left(\hat{\alpha}_v(t_k|t_{k-1}), F_{x\_vr}(t_k), \hat{F}_{z\_vr}(t_k), \hat{\mu}_{vr}(t_k)\right)$$

$$\hat{F}_{y\_hr}(t_k|t_{k-1}) = f\left(\hat{\alpha}_h(t_k|t_{k-1}), F_{x\_hr}(t_k), \hat{F}_{z\_hr}(t_k), \hat{\mu}_{hr}(t_k)\right)$$

$$\hat{F}_{y\_hl}(t_k|t_{k-1}) = f\left(\hat{\alpha}_h(t_k|t_{k-1}), F_{x\_hl}(t_k), \hat{F}_{z\_hl}(t_k), \hat{\mu}_{hl}(t_k)\right)$$

and the king pin inclinations $$\hat{\alpha}_v(t_k|t_{k-1}) = -\delta(t_k) + \frac{\hat{V}_y(t_k|t_{k-1})}{V_x(t_k)} + \frac{l_v\dot{\hat{\psi}}(t_k|t_{k-1})}{V_x(t_k)} \qquad F4.4$$

$$\hat{\alpha}_h(t_k|t_{k-1}) = \frac{\hat{V}_y(t_k|t_{k-1})}{V_x(t_k)} + \frac{l_v\dot{\hat{\psi}}(t_k|t_{k-1})}{V_x(t_k)}$$

Figure 5:
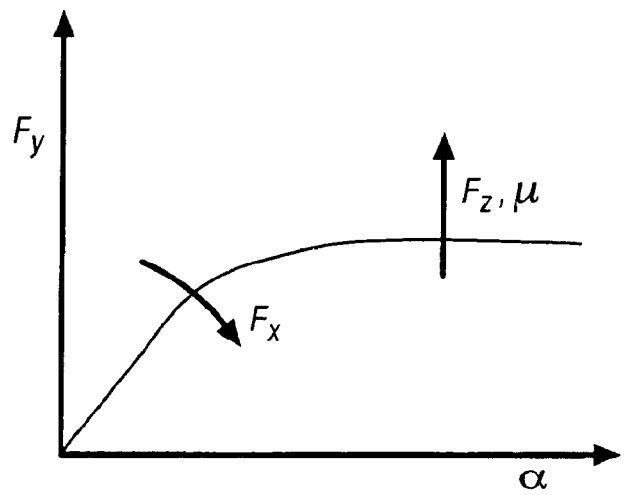
FIG. 5 illustrates the vehicle speed and the operating-point-responsive lateral tire stiffness values

The tire model pursuant equation F4.3 depicts the non-linear characteristics of the characteristic curve of the lateral tire force, as it is illustrated in FIG. 5 principally as a function of the essential influencing variables. This characteristic curve may be plotted in tables, or preferably analytically in the way of e.g. an approximated polynomial.

After comparing the estimated with the measured outputs (F3.2) and correcting the states (F3.3), the estimated controlled quantities $\hat{y}_r(t_k|t_k)=h_r(\hat{x}(t_k|t_k),u_m(t_k))$ may be determined with the updated states pursuant equation F3.4 by means of the non-linear initial equation.

$$\hat{y}_{r1} = \hat{\beta}(t_k|t_k) = \frac{\hat{V}_y(t_k|t_k)}{V_x(t_k)} \qquad F4.5$$

$$\hat{y}_{r2} = \hat{\alpha}_v(t_k|t_k)$$

$$\hat{y}_{r3} = \hat{\alpha}_h(t_k|t_k)$$

$$\hat{y}_{r4} = \dot{\hat{\psi}}(t_k|t_k)$$

with the estimated king pin inclinations:

$$\hat{\alpha}_v(t_k|t_{k-1}) = -\delta(t_k) + \frac{\hat{V}_y(t_k|t_k)}{V_x(t_k)} + \frac{l_v\dot{\hat{\psi}}(t_k|t_k)}{V_x(t_k)} \qquad F4.6$$

$$\hat{\alpha}_h(t_k|t_{k-1}) = \frac{\hat{V}_y(t_k|t_k)}{V_x(t_k)} + \frac{l_v\dot{\hat{\psi}}(t_k|t_k)}{V_x(t_k)}$$

The estimated controlled quantity $\dot{\hat{\psi}}$ is not used in the subsequent embodiment for the controller because a yaw rate sensor of up-to-date quality is made the basis.

The estimation of the states for the next sampling moment is effected according to equation F3.6 by means of the non-linear system equations:

$$\dot{\hat{x}}(t_k|t_k) = f(\hat{x}(t_k|t_k), u(t_k)) \qquad F4.7$$

$$\dot{\hat{x}}_1 = \dot{\hat{V}}_y = -V_x\dot{\hat{\psi}} + \frac{1}{m}\Big((F_{x\_vr} + F_{x\_vl})*\sin\delta + \left(\hat{F}_{y\_vl} + \hat{F}_{y\_vr}\right)*\cos\delta + \left(\hat{F}_{y\_hl} + \hat{F}_{y\_hr}\right) + \hat{F}_d\Big)$$

$$\dot{\hat{x}}_2 = \ddot{\hat{\psi}} = \frac{1}{\Theta}\Big(\left(\hat{F}_{y\_vl} + \hat{F}_{y\_vr}\right)*l_v*\cos\delta + (F_{x\_vr}*b_{vr} - F_{x\_vl}*b_{vl})*\cos\delta + +$$
$$(F_{x\_vl} + F_{x\_vr})*l_v*\sin\delta + \left(\hat{F}_{y\_hl}*b_{vl} - \hat{F}_{y\_vr}*b_{vr}\right)*\sin\delta - -$$
$$\left(\hat{F}_{y\_hl} + \hat{F}_{y\_hr}\right)*l_h - F_{x\_hl}*b_{hl} + F_{x\_hr}*b_{hr}\Big)$$

$$\dot{\hat{x}}_3 = \dot{\hat{F}}_d = 0$$

with the estimated tire forces from the tire model, with the king pin inclinations of equation F4.6 being used.

$$\hat{F}_{y\_vl}(t_k|t_k) = f\left(\hat{\alpha}_v(t_k|t_k), F_{x\_vl}(t_k), \hat{F}_{z\_vl}(t_k), \hat{\mu}_{vl}(t_k)\right) \qquad F4.8$$

$$\hat{F}_{y\_vr}(t_k|t_k) = f\left(\hat{\alpha}_v(t_k|t_k), F_{x\_vr}(t_k), \hat{F}_{z\_vr}(t_k), \hat{\mu}_{vr}(t_k)\right)$$

$$\hat{F}_{y\_hr}(t_k|t_k) = f\left(\hat{\alpha}_h(t_k|t_k), F_{x\_hr}(t_k), \hat{F}_{z\_hr}(t_k), \hat{\mu}_{hr}(t_k)\right)$$

$$\hat{F}_{y\_hl}(t_k|t_k) = f\left(\hat{\alpha}_h(t_k|t_k), F_{x\_hl}(t_k), \hat{F}_{z\_hl}(t_k), \hat{\mu}_{hl}(t_k)\right)$$

4.2 Combined Yaw Rate/Sideslip Angle Control

In the following, an embodiment of a lateral dynamics controller is described with respect to the preferred embodiment 'Control with measured yaw rate and estimated sideslip angle' (cf. Section 3.2 and FIG. 3). The transmission course with the controller $G_\psi$ for the yaw rate component is taken from the standard ESP and will not be illustrated herein in detail.

Figure 4:
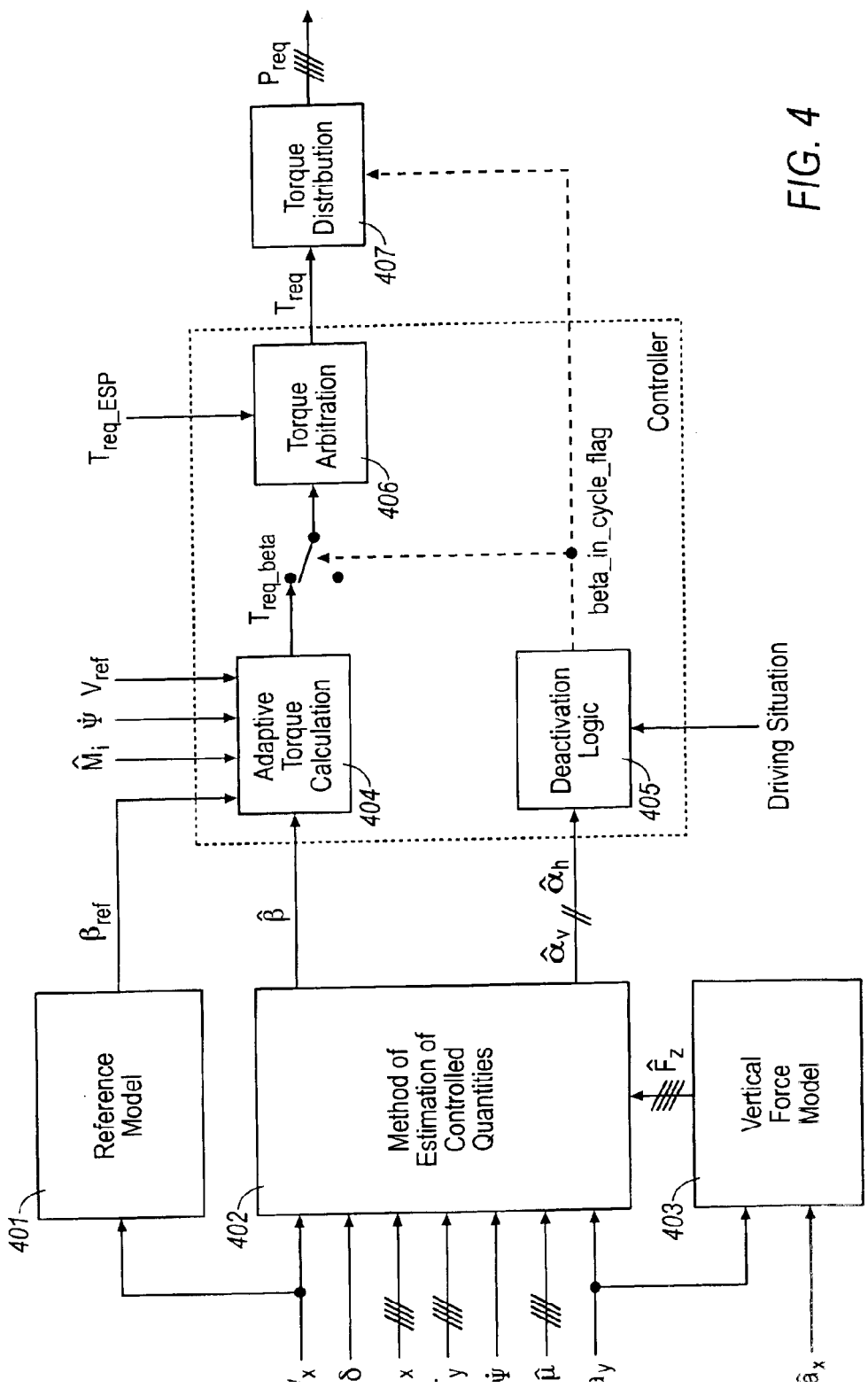
FIG. 4 describes the essential extensions over the standard ESP by the part of the sideslip angle control.

In FIG. 4 the essential extensions over the standard ESP are described by the part of the sideslip angle control.

Reference Model

In block 401 a sideslip angle reference quantity is determined as a function of the longitudinal vehicle speed $V_x$ pursuant equation (F4.8):

$$\beta_{ref} = \begin{cases} \beta_{0,ref} - kV_x & \text{for } V_x < V_{limit} \\ \beta_{limit,ref} & \text{for } V_x \geq V_{limit} \end{cases} \text{ for } \hat{\beta} > 0 \qquad \text{F4.8}$$

and $$\beta_{ref} = \begin{cases} -\beta_{0,ref} + kV_x & \text{for } V_x < V_{limit} \\ -\beta_{limit,ref} & \text{for } V_x \geq V_{limit} \end{cases} \text{ for } \hat{\beta} < 0$$

Figure 6:
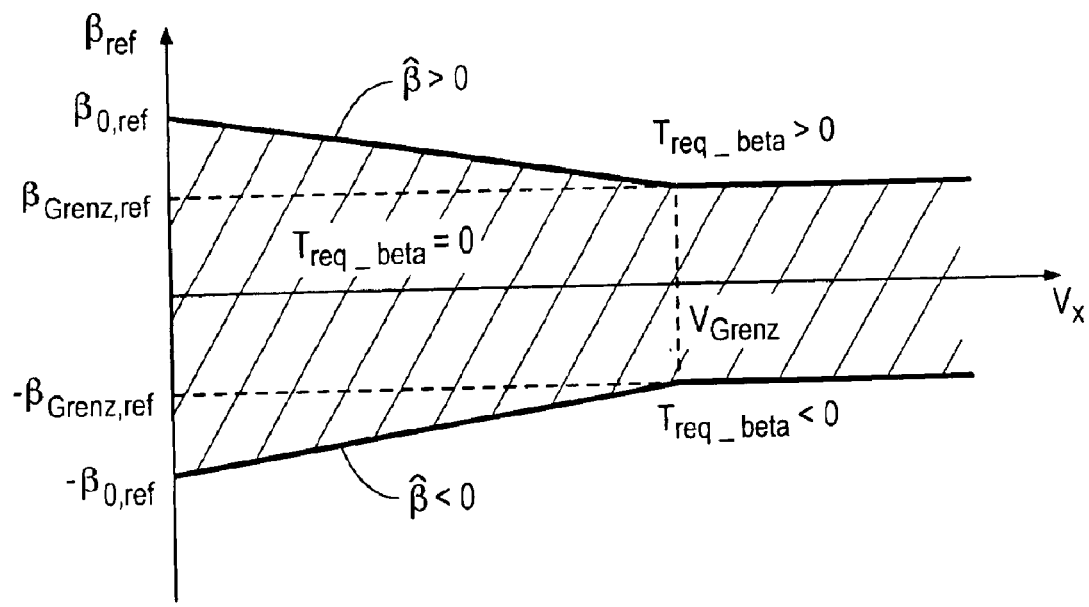
FIG. 6 illustrates the characteristic curve according to equation F4.8.

FIG. 6 illustrates the characteristic curve according to equation F4.8. The hatched band marks the zone of small sideslip angles of the vehicle that can still be easily mastered by the driver. No control intervention due to excessive sideslip angles is necessary within this zone $|b|<|b_{ref}|$. In dependence on rising speeds, the control entry threshold is reduced to a limit value $b_{limit,ref}$ because large sideslip angles are more difficult for the driver to master at higher speeds.

Typical values for the characteristic curve of the control entry threshold $b_{ref}$ are:

$$b_{0,ref} = 7°, \; b_{limit,ref} = 4°, \; V_{limit} = 80 \text{ km/h}$$

Vertical Force Model

A stationary model pursuant equation (F4.9) is used in block 403 for estimating the vertical forces. The vertical forces $F_z$ are estimated with the longitudinal and lateral accelerations $a_x$ and $a_y$ applied to the center of gravity. The longitudinal acceleration may be a quantity measured by a sensor as well as a quantity estimated from the wheel speeds, e.g. in the standard ESP.

$$\hat{F}_{z\_vl} = \frac{m}{l}(l_h g - h\hat{a}_x)\left(\frac{1}{2} - \frac{h}{b_v g}a_y\right) \qquad \text{F4.9}$$

$$\hat{F}_{z\_vr} = \frac{m}{l}(l_h g - h\hat{a}_x)\left(\frac{1}{2} + \frac{h}{b_v g}a_y\right)$$

$$\hat{F}_{z\_hl} = \frac{m}{l}(l_v g + h\hat{a}_x)\left(\frac{1}{2} - \frac{h}{b_h g}a_y\right)$$

$$\hat{F}_{z\_hr} = \frac{m}{l}(l_v g - h\hat{a}_x)\left(\frac{1}{2} + \frac{h}{b_h g}a_y\right)$$

$$l = l_v + l_h$$
$$b_v = b_{vl} + b_{vr}$$
$$b_h = b_{hl} + b_{hr}$$

Adaptive Torque Calculation

In block 404, an additional yaw torque stabilizing the vehicle is calculated according to equation (F4.11) from the sideslip angle difference $$\Delta\beta = \beta_{ref} - \hat{\beta} \qquad \text{F4.10}$$

in an adaptive manner, i.e., as a function of other quantities such as yaw rate $\dot\psi$, yaw rate control difference $\Delta\dot\psi$, vehicle speed $V_x$, and tire/road coefficient of friction m.

$$T_{req\_beta} = \begin{cases} f(\hat{\beta}, \Delta\beta, V_x, \dot\psi, \Delta\dot\psi, \mu) & \begin{array}{l}\text{for } \hat{\beta} > \beta_{ref}, \dot\psi < 0, V_x > V_{min} \\ \text{for } \hat{\beta} < -\beta_{ref}, \dot\psi > 0, V_x > V_{min}\end{array} \\ 0 & \text{otherwise} \end{cases} \qquad \text{F4.11}$$

An additional torque $T_{req\_beta}$ is calculated when the estimated sideslip angle $\hat\beta$ lies outside the band limited by $b_{ref}$, as shown in FIG. 6. The direction of the yaw rate is another condition. When the car turns already into the 'proper' direction, for example $\hat\beta > \beta_{ref}$ and $\dot\psi > 0$, an additional torque becomes unnecessary. No control is required below a speed $V_{min}$.

Figure 7:
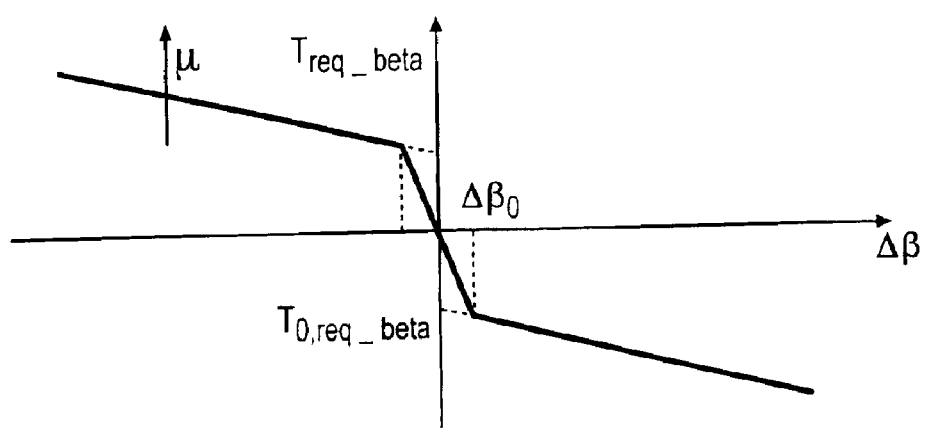
FIG. 7 illustrates a typical variation of the required additional torque $T_{reqbeta}$ in dependence of the deviation Db is shown.
Figures 8A, 8B:
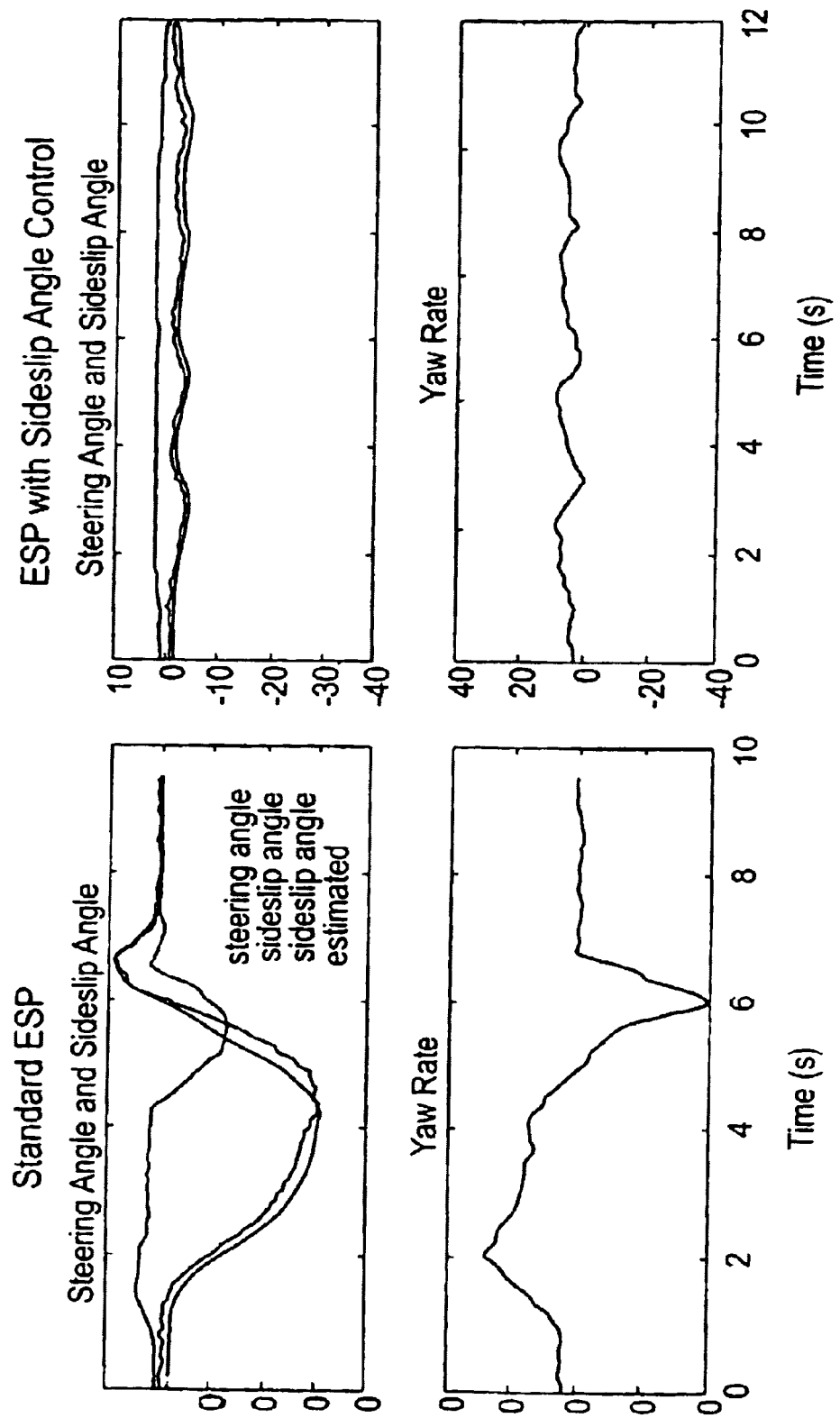
FIG. 8A shows steering angle, side slip angle, and side slip angle estimated as function of time in standard ESP control conditions.
FIG. 8B shows steering angle, side slip angle, and side slip angle estimated as function of time in Situations where the driver increases the control deviation by steering corrections.

When the conditions for an additional torque are satisfied, the additional torque is preferably calculated proportionally in relation to the deviation Db. In FIG. 7 a typical variation of the required additional torque $T_{req\_beta}$ in dependence on the deviation Db is shown. The zero torque $T_{0,req\_beta}$ is necessary in order to achieve a significant additional yaw torque for driving stabilization when the control commences. However, to render the entry into the control and the exit therefrom more smoothly, it is favorable to provide a finite gradient for small deviations $Db < Db_0$. A typical value is $Db_0 = 0.5°$ to $1.5°$.

Further, it is suitable to increase the required additional torque $T_{req\_beta}$ in dependence on the frictional value m as shown in FIG. 7.

Torque Arbitration

In block 406 the yaw torque of the standard ESP in superposed on the yaw torque determined pursuant equation (F4.11) in the following manner:

$$T_{req} = \begin{cases} T_{req\_ESP} + T_{req\_beta} & \text{for } \text{sign}(T_{req\_ESP}) = \text{sign}(T_{req\_beta}) \\ T_{req\_ESP} & \text{for } \text{sign}(T_{req\_ESP}) \neq \text{sign}(T_{req\_beta}) \end{cases} \qquad \text{F4.12}$$

Deactivation Logic

The sideslip angle control is deactivated during rearward driving or when driving around a steep turn and if the difference between the king pin inclinations at the front and rear axles is large, i.e., $$\Delta\alpha = |\hat\alpha_v - \hat\alpha_h| > \Delta\alpha_{max} \qquad \text{F4.13}$$

Torque Distribution

The nominal values of the wheel brake pressure are determined from the required additional torque in a way similar to the standard ESP. The difference compared to the standard ESP involves that with the sideslip angle control active, pressure is also required on the rear wheels in addition to the pressure requirement on the front wheels. In this respect, a distinction is made as to whether the sideslip angle control is active alone, or whether the standard ESP is active in addition.

What is claimed is:

1. Method for determining values of driving dynamics for a motor vehicle, comprising the steps of:
   determining estimated output quantities $\hat{y}_m$ in dependence on determined or estimated input quantities u and predetermined or predicted vehicle state variables $\hat{x}$,
   comparing the estimated output quantities $\hat{y}_m$ with measured output quantities $y_m$, determining the estimated driving dynamics quantities $\hat{x}(t_k/t_k)$ in dependence on the measured output quantities.

2. Method as claimed in claim 1, including the additional step of: determining the predicted vehicle state variables $\hat{x}$ in dependence on determined or estimated input quantities u and the driving dynamics quantities $\hat{x}(t_k/t_k)$.

3. Method as claimed in claim 1, wherein the following input quantities $u(t)=\hat{V}_x$, $\delta$, $F_x$; $\hat{F}_z$ or $F_z$, $\hat{\mu}_i$ or $\mu_i$ are used in the estimation of the predicted vehicle state variables $\hat{x}$ and in the determination of the driving dynamics quantities $\hat{x}(t_k/t_k)$, where $\hat{V}_x$=estimated longitudinal vehicle speed, $\delta$=the measured steering angle, $F_x$=the determined longitudinal tire or wheel forces, $\hat{F}_z$=the estimated vertical forces, or $F_z$=the determined vertical forces, $\hat{\mu}_i$=the estimated coefficients of friction for the tire/road contact or $\mu_i$=the determined coefficients of friction for the tire/road contact.

4. Method as claimed in claim 1, wherein as driving dynamics quantities and the predicted vehicle state variables $\hat{x}=[\hat{V}_y,\dot{\psi}]^T$ or $\hat{x}=[\hat{V}_y,\dot{\psi},\hat{F}_d]^T$ the lateral vehicle speed $\hat{V}_y$, the yaw rate $\dot{\psi}$ and the disturbing forces $\hat{F}_d$, which are estimated as non-measurable input quantities, are determined.

5. Method as claimed in claim 4, wherein as other quantities of driving dynamics and of the predicted vehicle state variables $\hat{x}=[\hat{T}_d,\mu_i]^T$ the disturbing torques $M_d$ and the coefficients of friction $\mu_i$ are determined as non-measurable input quantities.

6. Method as claimed in claim 1, wherein the predicted vehicle state variables $\hat{x}$ for the next sampling moment $t_{k+1}$ are achieved by integration pursuant the non-linear equation $$\hat{x}(t_{k+1}|t_k) = \hat{x}(t_k|t_k) + \int_{t_k}^{t_{k+1}} f(\hat{x}(t),u(t))dt$$

with the start condition $\hat{x}(t_k/t_k)$, where $\hat{x}$ estimated state vector, $f(.)$ continuous, non-linear system equations $x(t_k)$ signal at the discrete moment $t_k$, (current moment)

$\hat{x}(t_k|t_k)$ estimated signal at the moment $t_k$, with only information of the last moment $t_{k-1}$ used $\hat{x}(t_k|t_k)$ estimated signal at the moment $t_k$, with information of the current moment $t_k$ used $\hat{x}(t_{k+1}|t_k)$ predicted signal for the next moment $t_{k+1}$, with only information of the current moment $t_k$ used $t_k$ discrete moment.

7. Method as claimed in claims 1, wherein as an output quantity $\hat{y}_m=[\hat{\alpha}_y]$ the lateral acceleration $\alpha_y$ is estimated.

8. Method as claimed in claim 1, wherein as another output quantity $\hat{y}_m=[\dot{\psi}]$ the yaw rate $\dot{\psi}$ is estimated.

9. Method as claimed in claim 1, wherein as still other output quantities $\hat{y}_m=[\hat{F}_y]^T$ the lateral tire and wheel forces $F_y$, are estimated.

10. Method as claimed in claim 1, wherein the output quantities $\hat{y}_m$ for the sampling moment $t_k$ are estimated according to the discrete, non-linear equation $h_m$ $$\hat{y}_m(t_k|t_{k-1})=h_m(\hat{x}(t_k|t_{k-1}),u_m(t_k))$$

from the vehicle state variables $\hat{x}(t_k|t_{k-1})$ and the input quantities $u_m(t_k)$, where $\hat{y}_m$ estimated state vector of the measurable outputs $\hat{x}$ estimated state vector $u_m$ input vector of the measurable inputs $h_m(.)$ discrete, non-linear measurement equations $\hat{x}(t_k|t_{k-1})$ estimated signal at the moment $t_k$, with only information of the last moment $t_{k-1}$ being used $\hat{y}(t_k|t_{k-1})$ estimated signal at the moment $t_k$, with only information of the last moment $t_{k-1}$ used $t_k$ discrete moment.

11. Method as claimed in claim 1, wherein at least one of the estimated output quantities $\hat{y}_m=[\hat{F}_y,\hat{\alpha}_y,\dot{\psi}]^T$ is compared to at least one of the determined (acquired directly or indirectly by means of sensors) output quantities $y_m(t_k)=[F_y,\alpha_y,\dot{\psi}]^T$ and the comparison results $e(t_k)$ are summed by way of a gain matrix K, for the correction of the vehicle state variable $\hat{x}(t_k|t_{k-1})$, where $\hat{x}(t_k|t_{k-1})$=estimated signal at the moment $t_k$, with information of the last moment $t_{k-1}$ being used.

12. Method as claimed in claim 11, wherein the gain matrix K at every moment $t_k$ is defined pursuant the relation $K(t_k)=f(\hat{A},G)$, where G=information content of the determined (measured) signals and $\hat{A}$=estimated operating point of the non-linear vehicle model.

13. Method as claimed in claim 4, wherein the correction of the driving dynamics quantities is carried out according to the relation $$\hat{x}(t_k|t_k)=\hat{x}(t_k|t_{k-1})+K(t_k)e(t_k).$$

14. Method as claimed in claim 1, including the additional step of:

determining the estimated controlled quantities $y_r$ at the moment $t_k$ by using information of the current moment from the driving dynamics quantities $\hat{x}(t_k|t_k)$ and the input quantities $u_m(t_k)$ according to the relation $\hat{y}_r(t_k|t_k)=h_r(\hat{x}(t_k|t_k),u_m(t_k))$, where $u_m(t_k)$=vector of the sensed discrete input quantities.

15. Method as claimed in claim 1, including the additional step of:

determining the estimated controlled quantities $y_r$ at the moment $t_k$ by using information of the last moment from the vehicle state variables $\hat{x}(t_k|t_{k-1})$ and the input quantities $u_m(t_k)$ according to the relation $\hat{y}_r(t_k|t_{k-1})=h_r\hat{x}(t_k|t_{k-1}),u_m(t_k))$, where $u_m(t_k)$=vector of the sensed discrete input quantities.

16. Method as claimed in claim 1, including the additional step of:

determining an estimated sideslip angle $\hat{\beta}$ as a controlled quantity $\hat{y}_r(t_k|t_{k-1})$ or $\hat{y}_r(t_k|t_k)$, respectively, comparing the estimated sideslip angle $\hat{\beta}$ with a sideslip angle reference quantity $\beta_{ref}$, producing an additional yaw torque $T_{req}$ from the estimated difference between the sideslip reference quantity $\beta_{ref}$ and the sideslip angle $\hat{\beta}$ and a difference between a yaw rate reference quantity $\dot{\psi}_{ref}$ and a yaw rate $\dot{\psi}$ or $\dot{\psi}_{linear}$ and actuation of at least one wheel brake of the motor vehicle in dependence on the additional yaw torque $T_{req}$.

17. Method as claimed in claim 16, wherein the sideslip angle reference quantity $\beta_{ref}$ is an activation threshold that is variable in dependence on the speed $V_x$, e.g. $V_{ref}$, of the vehicle.

18. Method as claimed in claim 16, wherein the sideslip angle reference quantity $\beta_{ref}$ is determined in a dynamic model, in particular the one-tack model.

19. Method as claimed in claim 15, wherein the yaw rate $\dot{\psi}$ is estimated as a controlled quantity $\hat{y}_r(t_k|t_{k-1})$.

20. Method as claimed in claim 16, wherein the yaw rate $\dot{\psi}$ is estimated as a controlled quantity $\hat{y}_r(t_k|t_{k-1})$.

21. Method as claimed in claim 15, wherein the estimated yaw rate $\dot{\psi}$ is produced in dependence on a measured yaw rate $\dot{\psi}$ of reduced quality or a substitute signal $\dot{\psi}_{linear}$.

22. Method as claimed in claim 16, wherein the estimated yaw rate $\dot{\psi}$ is produced in dependence on a measured yaw rate $\dot{\psi}$ of reduced quality or a substitute signal $\dot{\psi}_{linear}$.

23. Method as claimed in claim 15, wherein the additional yaw torque $T_{req}$ is produced in dependence on the measured yaw rate $\dot{\psi}$.

24. Method as claimed in claim 15, wherein the king pin inclinations of the tires for the front axle $\hat{\alpha}_v$ and the rear axle $\hat{\alpha}_h$ are estimated as controlled quantity $\hat{y}_r(t_k|t_k)$.

25. Method as claimed in claim 16, wherein the king pin inclinations of the tires for the front axle $\hat{\alpha}_v$ and the rear axle $\hat{\alpha}_h$ are estimated as controlled quantity $\hat{y}_r(t_k|t_{k-1})$.

26. Driving dynamics control means, wherein a method as claimed in claim 1 is implemented.

27. Driving dynamics control means as claimed in claim 26, comprising an ESP control.

28. Driving dynamics control means as claimed in claim 26, comprising a suspension control.

29. Driving dynamics control means as claimed in claim 26, comprising a first determining unit (402) for estimating the controlled quantities $\hat{\beta}$ and/or $\hat{\alpha}_v$, $\hat{\alpha}_h$ from the input quantities $V_x$, $\delta$, $F_x$, $\dot{\psi}$, $\hat{\mu}$, $\alpha_y$, $\hat{F}_x$, and/or, if necessary, other quantities $F_z$, $\dot{\psi}_{linear}$, deactivation logic (405) for deactivating the sideslip angle control in dependence on the input quantities $\hat{\alpha}_v$, $\hat{\alpha}_h$ and/or quantities representative of the driving situations of the motor vehicle, such as rearward driving, driving around a steep turn, and the like second determining unit (404) for the adaptive sideslip angle torque calculation from the input quantities $\hat{\beta}$, $\beta_{ref}$, $\dot{\psi}$, $V_{ref}$ or Vx, $\hat{\mu}_i$, respectively third determining unit for the arbitration of an additional yaw torque $T_{req}$, from the yaw torque $T_{req\_ESP}$ and $T_{req\_beta}$.

30. Driving dynamics control means as claimed in claim 29, wherein the first determining unit is connected to a vertical force model for estimating the vertical forces $\hat{F}_x$ of the motor vehicle from the input quantities $\alpha_y$, $\hat{\alpha}_x$.

31. Driving dynamics control means as claimed in claim 29, wherein the second determining unit is connected to a reference model for determining the activation threshold which is variable responsive to the speed $V_x$ or $V_{ref}$, respectively.

* * * * *